(12) United States Patent
Dinker et al.

(10) Patent No.: US 7,716,335 B2
(45) Date of Patent: May 11, 2010

(54) SYSTEM AND METHOD FOR AUTOMATED WORKLOAD CHARACTERIZATION OF AN APPLICATION SERVER

(75) Inventors: Darpan Dinker, Union City, CA (US); Herbert D. Schwetman, Austin, TX (US); Jan L. Bonebakker, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1133 days.

(21) Appl. No.: 11/346,900

(22) Filed: Feb. 3, 2006

(65) Prior Publication Data

US 2007/0011330 A1    Jan. 11, 2007

Related U.S. Application Data

(60) Provisional application No. 60/694,450, filed on Jun. 27, 2005.

(51) Int. Cl.
*G06F 15/173* (2006.01)
(52) U.S. Cl. .................................. 709/226; 709/203
(58) Field of Classification Search ................ 709/223, 709/226
See application file for complete search history.

(56) References Cited

U.S. PATENT DOCUMENTS

| | | | |
|---|---|---|---|
| 6,209,018 B1 * | 3/2001 | Ben-Shachar et al. | 718/105 |
| 6,697,964 B1 | 2/2004 | Dodrill et al. | |
| 6,792,460 B2 | 9/2004 | Oulu et al. | |
| 6,801,940 B1 | 10/2004 | Moran et al. | |
| 6,907,546 B1 * | 6/2005 | Haswell et al. | 714/38 |
| 6,944,798 B2 | 9/2005 | Stephenson et al. | |
| 2004/0204984 A1 | 10/2004 | Yeh et al. | |
| 2005/0091366 A1 | 4/2005 | Acharya | |
| 2005/0132335 A1 | 6/2005 | Maron | |
| 2005/0144267 A1 | 6/2005 | Maron | |
| 2005/0222689 A1 | 10/2005 | Smith et al. | |
| 2005/0223368 A1 | 10/2005 | Smith et al. | |
| 2005/0228880 A1 | 10/2005 | Champlin | |
| 2005/0262060 A1 | 11/2005 | Rohwedder et al. | |

* cited by examiner

*Primary Examiner*—Quang N. Nguyen
*Assistant Examiner*—Andrew Woo
(74) *Attorney, Agent, or Firm*—Robert C Kowert; Meyertons, Hood, Kivlin, Kowert & Goetzel, P.C.

(57) ABSTRACT

An application server may be instrumented to provide a resource measurement framework to collect resource usage data regarding request processing by the application server and applications executing on the application server. The resource measurement framework of an application server may collect hardware and software resource usage data regarding request processing at interception points located at interfaces between application components and services or other components of the application server by instrumenting those interfaces. The resource measurement framework may collect resource usage by instrumenting standard interfaces and/or methods of various specifications, such as implemented by containers or other components of the application server. Thus, the resource measurement framework may collect resource usage for applications or application components that do not include any resource measuring capabilities. The collected resource usage data may be parsed and combined to create an overall characterization of resource usage corresponding to the application server's request processing.

18 Claims, 7 Drawing Sheets

SYSTEM AND METHOD FOR AUTOMATED WORKLOAD CHARACTERIZATION OF AN APPLICATION SERVER

PRIORITY DATA

This application claims benefit of priority to Provisional Application Ser. No. 60/694,450 titled "Automated J2EE Workload Characterization" filed Jun. 27, 2005, whose inventors are Darpin Dinker, Herbert D. Schwetman and Jan L. Bonebakker, and which is herein incorporated by reference in its entirety.

BACKGROUND OF THE INVENTION

1. Field of the Invention

This invention relates to the field of hardware and software performance analysis and workload characterization, and more particularly to workload characterization in application server environments.

2. Description of Related Art

The field of application servers is a fast-growing and important field in the computing industry. As web applications and other distributed applications have evolved into large-scale applications that demand more sophisticated computing services, specialized application servers have been developed to provide a platform supporting these large-scale applications. Applications that run on application servers are generally constructed according to an N-tier architecture, in which, for example, presentation, business logic, and data access layers are kept separate. The application server space is sometimes referred to as "middleware", since application servers are often responsible for deploying and running the business logic layer and for integrating, and interacting with, various enterprise-wide resources, such as web servers, databases, and backend or legacy systems.

Application servers typically provide application services for tasks that web applications and other networked applications commonly need. Application servers often incorporate these services and components into an integrated platform specialized for creating web applications. The platform may leverage various standard software component models, such as the Common Object Request Broker Architecture (CORBA), the (Distributed) Component Object Model (COM/DCOM), Enterprise JavaBeans™ (EJB), etc., or the platform may provide its own software component model or may extend standard component models.

An application server may implement application component containers. An application component container, or simply "container", generally refers to a software framework that manages and supports the execution of application components. For example, a Java™ based application component container may include a container that functions according to the Java™ 2 Platform Enterprise Edition Specification, v1.3 (J2EE™). In many instances, J2EE™ services in a J2EE™ application server tier, such as web services, enterprise beans, message beans, etc., may be implemented using a container environment. This container environment may provide services (e.g. security, transaction, life-cycle management) that are used by server applications written in Java™ for the J2EE™ platform. In a J2EE™ environment, a web component may be assembled into a J2EE™ web module and deployed within a web container, and an enterprise bean may be assembled into a J2EE™ EJB module and deployed within an EJB container. One example of such an environment is the JES Application Server (frequently referred to as AppServer) from Sun Microsystems, Inc. With AppServer, application developers may create their applications that are accessed through Web services (HTTP, XML/SOAP, JMS, etc.) or rich-client paths such as RMI/IIOP. An example of a J2EE™ application is an online retail E-commerce web site that serves as a product catalog, has a shopping cart, and a check-out module.

A growing number of Java 2 Enterprise Edition (J2EE™) applications are middleware applications that use a variety of technologies (web, xml, relational and object databases, portal, messaging, transaction, legacy, etc.) and support various lines of business. Many modern on-line services are frequently implemented using a multi-tiered approach, placing different services on different tiers of the total system. A typical system configuration may be made up of three tiers, for example, a web server tier, a application server tier, and a database tier.

The first, or client tier may include a number of different clients communicating with application components (e.g., servlets, server pages, beans) in the middle tier or application server. The clients may communicate with the application server via a network, an example of which may be the Internet. A backend tier may include various system resources, such as databases or other information systems.

Application components within a tier typically communicate with remote application components in an adjacent tier. For example, multiple users with access to an application component configured to operate in a client tier (e.g., an application client accessible via a web browser) may initiate requests to remote application components configured to operate in a middle tier, such as an application server. Each application component in the middle tier may, in turn, initiate requests to the backend tier, such as to system resources, on behalf of the application component in the client tier. For example, an application component in the middle tier may receive a remote request from a web browser operating in the client tier and in response invoke another application component to access a database object in the backend tier, for example. The application component accessing the backend tier may then provide a response to the application in the middle tier, which may complete the remote request, in this example.

A user of a multi-tier computer system may connect to the Internet and access the system using a web browser. The browser may send a request for service to a node in the web server tier. In some cases, the requested information may be in the form of a static page stored on the web server nodes; in these cases, the page may be returned immediately to the requesting browser. In other cases, the requested information may be developed dynamically for the specific request. These requests may be forwarded to a node in the application server tier. A forwarded request may invoke a particular application component or program that determines or generates the content for the request and may deliver this back to the web server, which in turn may deliver this back to the requesting browser.

Furthermore, the performance of the system may be a major factor in a user's perception of the service delivered by the system, namely response time. Systems maintaining service-level agreements (e.g., 90-th percentile response time <1.2 sec) may attract and retain customers for the site, while systems exhibiting sub-standard levels of performance may discourage customers from visiting the site. From the website administrator and deployer's perspective, throughput may be an important metric, as well as response time. Throughput measurements may provide the ability to gauge the system's ability to handle multiple user requests concurrently.

Applications running in an application server are frequently difficult to understand from a performance perspective (given their distributed nature and complexity) and they have traditionally not been characterized in any automated fashion. Application server vendors may provide performance tools and utilities. However, most performance tools focus on optimizations at development time, providing very limited capabilities to use them for any other task. Several Java™ performance tools provide the ability to identify "hot" methods or lines of code. When compared to other methods, the "hot" methods may be using more resources such as processor (CPU), memory (heap), lock (latency), disk and network 10, etc., affecting the response time of a service. Many Java™ performance tools use the Java™ virtual machine profiler interface [JVMPI] and also the Java™ virtual machine tool interface [JVMTI]; JVMTI, included in the Java Development Kit v1.5 [JDK], provides the ability to instrument Java™ classes statically, at load-time or dynamically. Several profilers, such as JFluid [JFLUID], provide developers an intuitive graphical user interface to display "hot" methods. However, workload characterization of standard benchmarks traditionally takes significant time and resources. It is generally non-trivial to characterize a customer/user application in sufficient detail due to time and resource constraints or due to an application's limited lifetime.

Studies of system performance generally require accurate descriptions of the system workload. Typically, the goal of a performance study is to gain an understanding of how the system is behaving currently and to make recommendations about corrective steps that may result in improved performance in the future. Each of these tasks may depend on having several key ingredients. One is an accurate description of the system components and how they interoperate. Another is an accurate description of the demands being made by the elements of the workload for use of these components. It may be important to understand the behavior of both the hardware and software environments and methods in order to get a comprehensive view of resource usage and performance. Traditional methods of workload characterization have been focused on either a high-level, software-centric analysis or a low-level, processor-centric analysis and have not tied hardware and software analysis together. Often, characterization is focused on a single application or a limited set of benchmarks. However, workload characterization determined by running benchmarks is often an inaccurate estimate of workload performance for any particular application since real applications do not utilize system resources exactly the same as benchmarks.

SUMMARY

The execution and performance of an application server and/or of applications executing on an application server may be characterized via the use of automated workload characterization, according to various embodiments. Automated workload characterization of application server systems may include characterization of both hardware resource usage and software method traces during execution of a software program, in some embodiments. The methods described herein for automated workload characterization may be used to characterize an application server executing one or more applications without the need to instrument the deployed applications themselves. For example, an application server may be instrumented, such as by inserted program instructions (or byte code corresponding to program instructions) to provide a resource measurement framework. A resource measurement framework may record resource usage data (regarding both software and hardware resource usage) related to the handling of requests, or other processing, by the application server. The resource usage data collected may also include execution trace data regarding the methods invoked during request processing, according to some embodiments. The resource measurement framework may allow workload characterization for an application running on an application server to be obtained without an application developer having to modify or instrument the application itself.

Application components may execute within application component container services, such as web or EJB containers. For instance, application components may be part of one or more J2EE applications executing on the application server. A resource measurement framework of an application server may collect resource usage regarding request processing at interception points between application components and the services, or other components, of the application server. For example, in some embodiments, standard interfaces that containers (such as Enterprise Java Beans, Web or Message Bean containers) implement may be instrumented. Additionally, other interfaces implemented by any of various standards, such as the Java Database. Connectivity (JDBC) standard, may also be instrumented. The application components themselves need not be modified to include any resource measuring capabilities, since the resource measurement framework may collect resource usage for applications or application components executing on an application server even when the applications or application components do not include any resource measuring capabilities. For instance, methods such as preinvoke, postinvoke are called by a container before and after calling a Bean's generic method. By instrumenting method, such as preinvoke and postinvoke, a resource measurement framework may characterize a Bean, even though the Bean itself has not be instrumented. Similarly, methods such as ejbpassivate, ejbCreate and ejbActivate may be instrumented to characterize a particular bean instance. Thus, by instrumenting standard interfaces and methods virtually any application utilizing those interfaces and/or methods may be characterized by a resource measurement framework, according to some embodiments.

A resource measurement framework may include instrumented methods of services, containers or other components of an application server. A resource measurement framework may not be a single component or entity, but instead may be a combination or integration of various instrumented methods of different services, containers, or other components, of an application server. For example, an application server running on a J2EE platform may include, for example, container services and services enabling applications (or application components) to access systems outside of the application server. Each service of an application server may include objects, methods or APIs through which application components may access the service, e.g. to connect to an external system such as a database.

Automated workload characterization may involve instrumenting an application server to create interception points located at interfaces, such as in a service's API methods, to collect various resource usage data, performance data, and/or execution trace information. For example, an application component may invoke a particular API method of a JDBC service of an application server. The invoked method may be instrumented to collect resource usage information, such as execution time, wall time, amount of data read or written, the amount of memory used etc, by the method invoked by the application component.

By instrumenting the boundaries between the application components and the other services or components of the application server, resource usage information about the application components may be collected even though the application components themselves may not be instrumented or otherwise capable of recording resource usage information. In some embodiments, multiple interfaces between application components and other services provided by the application server may be instrumented to collect resource usage and other performance information, such as execution traces, etc. In other embodiments, interfaces between different methods, services or components of the application server may be instrumented and part of a resource measurement framework regardless of whether they interface with application components. In other words, boundaries between application server components (e.g. containers and other services) may be instrumented to collect resource usage data regarding those components even when those components are not directly invoked by application components. For example, one service of the application server, such as an JDBC service may also utilize other services provided by the application server and automated workload characterization may collect and record resource usage information related to the performance of that particular JDBC service by collecting resource usage information at the boundaries between that service and other services of the application server.

In yet other embodiments, only certain interfaces may be instrumented, such as to record performance and resource usage information regarding only a particular set of services of the application server. For example, only those services related to disk usage may be instrumented to collect performance and resource usage information.

Recorded resource usage information, including execution trace data, may be analyzed (during or post execution) to determine or characterize the overall resource usage of individual methods, services, containers, applications or an entire application server. Additionally, collected information may be analyzed and/or summarized to provide average or overall resource usage for categories or types of services or resources. For example, the collected resource usage information may be analyzed to determine the amount of average disk space used for processing a particular type of request, in one embodiment. In another embodiment, the average amount of execution time spent accessing databases, such as via a JDBC service, may be characterized by analyzing recorded resource usage information. Thus, overall workload characterization regarding the performance of an application server executing particular application components may be determined.

In some embodiments, a stand-alone tool, such as a workload characterization tool, may include program instructions configured to implement automated workload characterization. A workload characterization tool may also include methods to determine the overhead associated with the workload characterization methods themselves, in some embodiments.

Automated workload characterization may provide data for several different tasks, according to various embodiments. For example, trace results may be combined with software and hardware resource usage measurements to generate a comprehensive view of resource utilization of an application server. According to one embodiment, the output from a workload characterization tool may be used to create statistical characterizations or profiles of application transactions.

Automated workload characterization may also include development of a simulation model that uses profiles of application transactions to simulate performance of the application. Automated workload characterization may, in some embodiments, be used to identify performance bottlenecks, sizing, capacity planning, architecture and design space trade-offs, and the like. In addition, a simulation model may, in some embodiments, be used to make predictions of performance of other applications operating in the characterized environment.

In some embodiments, automated workload characterization may include generating abstractions, or simulation models, of hardware and software components for extensive characterization and further analysis of performance. These abstractions may also be used to predict performance of an application executing in similar, new, or modified environments, in some embodiments.

Figure 1:
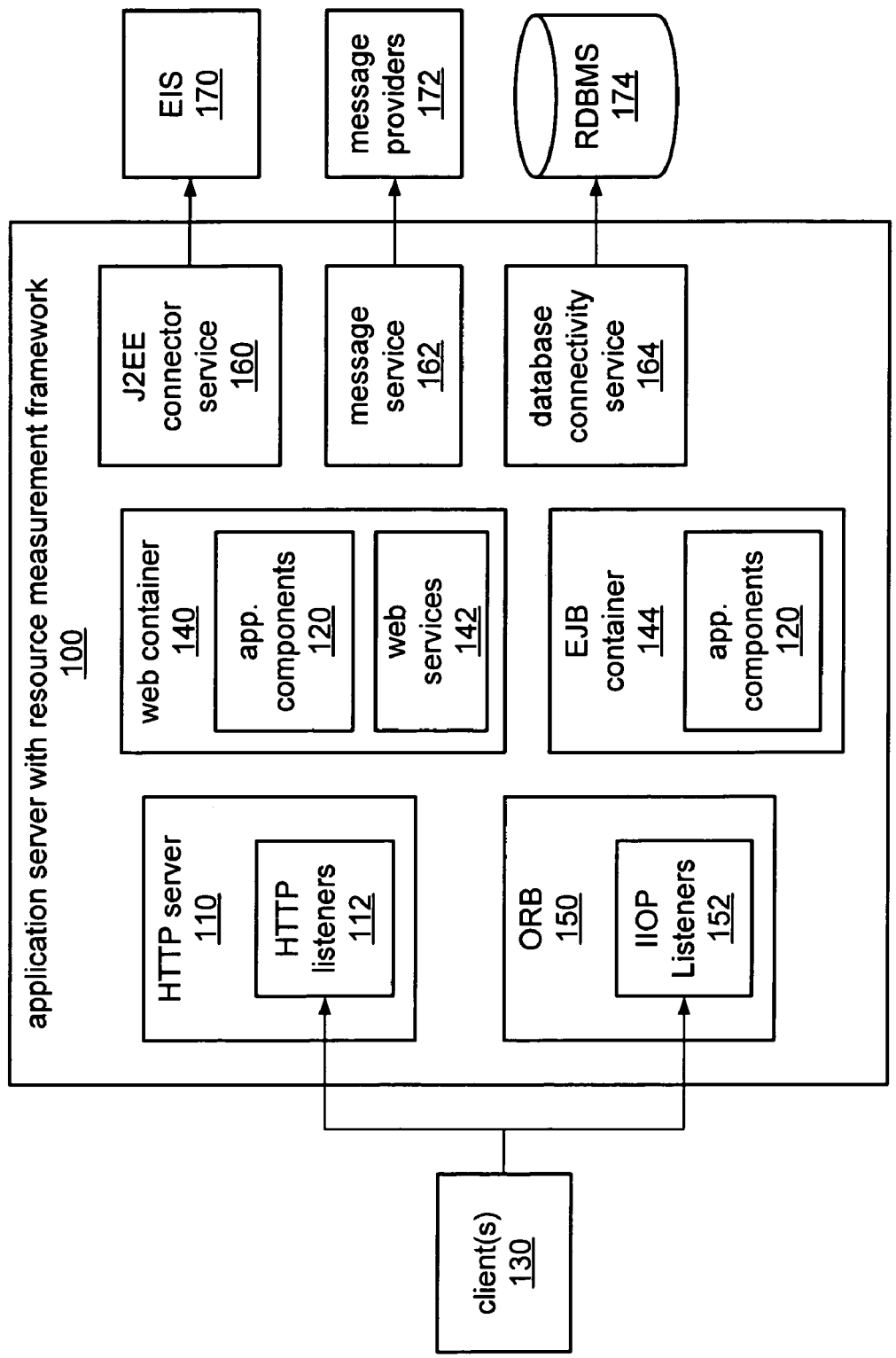
FIG. 1 is a block diagram illustrating one embodiment of an application server implementing automated workload characterization, as described herein.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Automated workload characterization may be used to characterize the performance of an application server, and of application executing on the application server, by capturing and analyzing information about both the sequence of software methods invoked and the hardware and software resources utilized during execution of the application on the application server. The execution and performance of an application server and/or of applications executing on an application server may be characterized via the use of automated workload characterization, according to various embodiments. For example, an application server may be instrumented, such as by inserting program instructions (or byte code corresponding to program instructions) to provide a resource measurement framework. In some embodiments, a resource measurement framework may record execution trace information and resource usage data (regarding both software and hardware resource usage) related to the handling of requests, or other processing, by the application server.

As noted above, an application server may include multiple services supporting application components executing on the application server. The services may provide access to back end data, systems, or services, such as databases, network messaging, and the like. Application components may execute within application component containers, such as web or EJB containers. Application components may be part of one or more applications executing on the application server. A resource measurement framework on an application server may collect resource usage data at interception points between application components and the services, or other components, of the application server, in some embodiments. In other embodiments, the resource measurement framework may collect and record resource usage data at interception points located at interfaces between the various services of an application server regardless of whether those services are directly invoked by any application components executing on the application server.

In some embodiments, application components themselves may not include any resource measuring capabilities. Thus, a resource measurement framework may collect resource usage about application components executing on an application server even when the applications or application components do not include any resource measuring capabilities. For instance, applications that adhere to standards or specifications, such as the J2EE™ specification, may be characterized by instrumenting interfaces and methods implemented as part of the J2EE specification. For example, J2EE containers, such as EJB, Web and/or Message Bean containers, may implement certain interfaces and methods that may be instrumented to collect resource usage regarding the applications using those containers. Thus, by instrumenting standard interfaces and/or methods a resource measurement framework may, in some embodiments, characterize virtually any application executing in the application server that utilizes the interfaces or methods. The performance, trace, and resource usage data collected as part of automated workload characterization may, in different embodiments, include the number of times that a method was invoked, the order of execution of the methods invoked, the elapsed time during execution of the methods, the amount of memory accessed by the methods, and the like.

In some embodiments, the workload characterization data collected during execution of the software program may be logged during execution. For example, collected resource usage or trace data may be written to a file or database. Automated workload characterization may also include processing the collected characterization data to determine overall resource utilization of the combined methods invoked by the application or to generate detailed profiles of each of the individual methods invoked.

FIG. 1 is a block diagram illustrating one embodiment of a system implementing automated workload characterization. Application server 100 may be instrumented to provide a resource measurement framework for collecting resource usage data for the application server 100 and for applications, such as application component 120, running in application server 100. The collected resource usage data may be used for workload characterization of application server 100 as related to executing the applications. A resource measurement framework may include instrumented services, containers or other components of the application server. A resource measurement framework may not be a single component or entity, but instead may be a combination or integration of various instrumented methods of different services or containers of an application server. For example, in one embodiments, an application server 100 running on a J2EE platform may include services, such as J2EE connector service 160, message service 162, or database connectivity service 164, enabling applications, such as application components 120, to access systems outside of the application server, such as enterprise information system (EIS) 170, messaging provider 172 and RDBMS 174.

The services of application server 100 may include objects, methods or APIs through which application components 120 may access external systems. For instance, an application server may include a JDBC service, such as database connectivity service 164, to facilitate storing, organizing and retrieving data, such as in relational databases. A JDBC service may provide a JDBC API via which applications may access data. Similarly, an application server may include a messaging service, such as message service 172, providing a means for application components to communication with other software components. Applications may access the messaging service through a specific messaging API. Other services, such as J2EE connector service 160 providing access to enterprise information systems, or an email service providing access to SMTP servers for sending and receiving email, may also provide APIs via which application components 120 may invoke and use features or components of the services.

When using automated workload characterization, interception points at the interfaces between application components and other components of the application server may be instrumented to collect various resource usage data, performance data, and/or execution trace information. Typically, an application running on an application server may include multiple application components running within various service containers of the application server. Processing requests may involve several application components and thus resource usage information may be collected at the interfaces between the application components and the application server (or services, containers or other components of the application server). Additionally, interfaces or boundaries between the various components of application server 100 may also be instrumented to collect resource usage data. For example, an application component may invoke a particular API method of database connectivity service 164. The invoked method may be instrumented to collect resource usage information, such as execution time, clock time, an amount of data read or written, the amount of memory used etc, by the method invoked by the application component.

Clients external to application server 100, such as client 130, may connect to application server 100, such as via a network, to request or invoke functionality of one or more application components or services running on application server 100. Client 130 illustrated in FIG. 1, may represent various types of clients, in different embodiments. For instance, in some embodiments, client 130 may represent a web client, a web browser based client, IIOP clients, or other J2EE compatible clients. For example, browser clients may access web applications on application server 100 by communicating with application server via HTTP. HTTP server 110 and/or HTTP listener 112 may receive such communication from web clients, in some embodiments. Enterprise bean clients may communicate with application server 100 through object request broker (ORB) 150 via the IIOP protocol. Thus, application server 100 may include separate listeners, such as HTTP listener 110 and IIOP listener 152 for different forms of communication from client 130, according to various embodiments. In some embodiments, client 130 may represent a thin client, such as a client that relies upon a server for much of its functionality, or alternatively, a thick client that includes more functionality that a thin client.

For example, a request may be received from a client 130 by a HTTP server 110 of the application server 100 and then passed on to a particular application component 120. The HTTP service may also collect resource usage data when the request is received and may also record execution trace information indicating the particular object or method of the application component invoked to process the request. When passing control or forwarding a request to an application component, the container in which the particular application component is running may be invoked by the HTTP service and may record additional resource usage or execution trace information before invoking methods or objects of the application container. Thus, resource usage information may be recorded regarding a request prior to any application component actually starting to process the request. As the application component invokes other services of the application server to process the request, interception points at the interface between the application component and the invoked services may collect or record additional resource usage or other performance or execution information. Information may be collect both at the entry and exit of invoked service, object or methods.

Clients of the application server may also communicate with Object Request Broker (ORB) 150, such as via an Internet Inter-ORB Protocol (IIOP) protocol. An ORB may encompass the infrastructure necessary to identify and locate objects, such as objects that are part of application components or other services of the application server. The basic functionality of an ORB includes passing requests from clients to object implementations invoked by the clients. For example, a client may request a service without knowing any specific about where the objects are instantiated. ORBs may receive requests, forward them to the appropriate objects, and then communicate results back to the client. In one embodiment, ORB 150 may be part of the resource measurement framework and may include one or more interception points configured to intercept the receipt of a request and to collect and record resource usage information about the request.

Thus, the recorded information may be analyzed (post execution) to determine or characterize the overall resource usage of individual methods or services. Additionally, collected information may be analyzed and/or summarized to provide average or overall resource usage for categories or types of services or resources. For example, the collected resource usage information may be analyzed to determine the amount of average disk space used for processing a particular type of request, in one embodiment. In another embodiment, the average amount of execution time spent accessing databases, such as via a JDBC service, may be characterized by analyzing recorded resource usage information. Thus, overall workload characterization regarding the performance of an application server executing particular application components may be determined.

Instrumentation code in an application server, such as instrumented code in a resource measurement framework, may also collect a trace of entry and exit points of methods invoked during the running of the application server and may log the trace to a file at or after run-time. In order to trace an application executing in a J2EE™ environment, for example, the framework may record trace information at the interception points (i.e. the first points of request processing that are logged per unique request) for components of the application server, such as HTTP server 110, Enterprise Java bean (EJB) containers 144, web container 140, Object request brokers (ORB) 150, J2EE connector service 160, database connectivity service 164, message service 162, or other components. Other trace information collected may include the sequence and number of calls to one or more methods of the containers, in some embodiments.

The trace information collected may be saved in a temporary location, such as in a buffer allocated to each request or thread, in cache memory, or in a temporary location within the memory space of application server 100, in some embodiments. This trace data stored in a temporary location may then be flushed to a file, such as a file on application server 100, or written to a workload characterization database after completion of request processing, in some embodiments. In other embodiments, trace data may be written to a file on application server 100, to a workload characterization database, or another memory location, as they are collected or at some other point prior to completion of the request processing. In some embodiments, the collected trace data may be communicated to a remote computer for storage. The collected data may be encoded in various data formats or structures corresponding to various programming languages when it is stored, according to various embodiments.

For example, container and service methods invoked by application components may be instrumented to intercept method calls and collect resource usage information regarding the execution and performance of both the application components and the application server while the application components are executing. For instance, an application component executing on an application server may need to read data from a backend database and may interface or invoke methods of a JDBC service or container of the application server. Please note that in some embodiments, the application component may utilize custom beans for accessing backend systems and services and thus an instrumented bean container may be able to record resource usage or other performance information for the application server and application components usage of the backend systems and services.

An application server may include multiple containers, such as J2EE containers, that provide runtime support for application components. A container may be considered a runtime environment that provides services, such as security or transaction management, to application components running on the application server. Application components may use the protocols and methods of the containers to access other application components and services provided by the application server. The application server may also provide an application client container, an applet container, a Web container, and an EJB container. Web components, such as Java Server Pages (JSP) and servlets run within a web container, while Enterprise Java Beans run within an EBJ container. A web container may be a J2EE container that hosts web applications. A web container may extend the web server functionality by providing an environment to run servlets and Java Server Pages.

When collecting resource usage for application components running on an application server, the interfaces between individual application components and the containers in which those components are executing may be instrumented with instructions configured to record resource usage and other performance information, according to some embodiments. For example, an application running on an application server may include both a web application component and an EJB component, such as to read from a database. The container in which the web application component is running and the container in which the EJB is running may both be instrumented to collect resource usage information (or other performance or execution information). Thus, the containers provided as part of the application server may be considered part of a resource measurement framework including interception points at which resource usage data may be collected.

When capturing and recording resource (both software and hardware) usage regarding the performance on an application server, the application components themselves may not include any code to collect resource usage information. Instead, the various components, services, and containers of the application server may be instrumented to include program instructions configured to collect or record resource usage regarding the execution of the application components. For instance the interfaces and method implemented by a standard container specification, such as the J2EE container specification, may be instrumented. Thus, in some embodiments, any J2EE application may be characterized regardless of whether or not the application itself includes any functionality or capability for recording resource usage information.

As noted above, resource usage information may be collected by instrumented methods and interfaces of services, components, and containers of the application server in which application components are executing. Application servers may receive and service requests from clients 130, such as from web clients or IIOP clients. The application components actually services the requests may not be instrumented or otherwise configured to record or collect resource usage, but resource usage and performance information may be collected about the application components at various points within the application server. For example, the request may be received first by an HTTP component or service of the application server and then passed onto to a particular application or application component for servicing. Resource usage or performance information may be collected by the component or service that initially receives the request before it is passed to the application component. Similarly, when an application component invokes methods or objects of the application server, such as to read data from a database, the invoked methods may be instrumented to records resource usage, such as the amount of data read from a disk, or the elapsed time spent reading the data. Thus, by providing an instrumented set of services making up a resource measurement framework, resource usage or other performance information may be recorded for application components executing on the application server. Additionally, performance information or other resource usage regarding the execution and performance of the application server as it executes the application components may be recorded.

In some embodiments, resource usage data may be recorded and collected regarding individual services of the application server. For example, one service of the application server, such as an JDBC service may also utilize other services provided by the application server and automated workload characterization may collect and record resource usage information related to the performance of that particular JDBC service by collecting resource usage information at the boundaries between that service and other services of the application server.

Thus, in some embodiments, an application server may include multiple services providing support for applications running on the application server. The services may include application component containers for managing the execution of components of the applications that are running on the application server. The application server may also include a resource measurement framework including interception points each configured to intercept a request to one of the plurality of services. In response to a request, the resource management framework may record resource usage for the request. The resource measurement framework may also be configured to record resource usage data for requests to the services in order to characterize a workload of the application server while running the applications.

For example, an application server may receive a request and instrumented code at an interception point where a service, such as an HTTP listener service, receives the request may begin recording resource usage and other performance or trace information for the request. For instance, the time the request was received as well as other baseline resource information, such as the current amount of memory or disk usage, may be recorded to be compared with similar measurements recorded at the completion of processing the request. By recording initial resource usage information when a request is received and comparing those measurements with similar measurements recorded during and after processing the request, the overall resource usage for processing the request may be recorded and analyzed.

A resource measurement framework on an application server may include instrumented services that are utilized or invoked by applications (or application components) executing on the application server. By instrumenting the boundaries between the application components and the other services or components of the application server, resource usage information about the application may be collected even though the application itself may not be instrumented or otherwise capable of recording resource usage information. In some embodiments, every interface between application components and other services provided by the application server may be instrumented to collect resource usage and other performance information, such as execution traces, etc. In other embodiments, only certain interfaces may be instrumented, such as to record performance and resource usage information regarding only a particular set of services of the application server. For example, only those services related to disk usage may be instrumented to collect performance and resource usage information.

Figure 2:
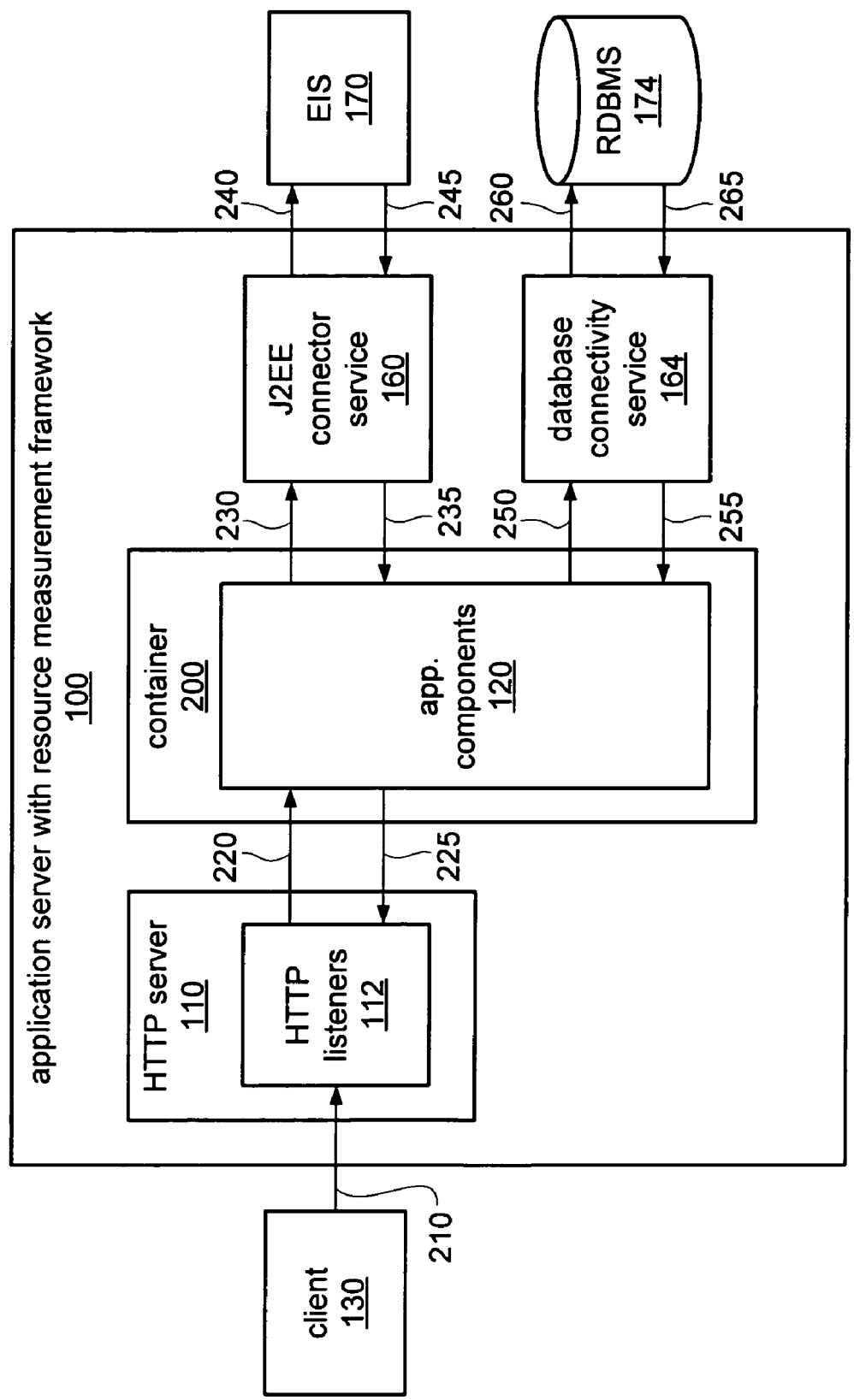
FIG. 2 is a block diagram illustrating an application server instrumented according to automated workload characterization, according to one embodiment.

FIG. 2 is a block diagram illustrating an instrumented application server with a resource measurement framework and also illustrating a logic flow of the processing of a request including the collection of resource usage data, according to one embodiment. For example, a client 130 may issue a request to application server 100 that may be received by HTTP server 110. For instance, client 130 may be a web client, such as a web browser, requesting a web page, in one embodiment. Arrow 210 may represent the request from client 130 to HTTP listener 112 of application server 100. As described above, application server 100 may have been instrumented to provide a resource measurement framework that includes interception points configured to intercept incoming requests to services, such as HTTP server 110, of application server 100. Thus, HTTP listener 112 may be instrumented to include an interception point configured to intercept request 210 and collect resource usage data regarding request 210. As noted above, the resource measurement framework, using instrumented code in HTTP listener 112, may also assign and/or associate a unique ID with request 210 and may also collect base line resource usage information for comparison with similar measurements collected later during processing of request 210.

When collecting and recording resource usage data, the instrumented methods of the resource measurement framework may also record execution trace data, according to some embodiments. For instance, HTTP listener 112, or HTTP server 110, may record the methods invoked during receiving and processing a received request and may also record resource usage information for the invoked methods. Thus, at each interception point (or instrumented method call), information regarding the method invoked, as well as hardware and software resource usage maybe collected and recorded. For example, each entry in a set of recorded resource usage data may include information regarding an invoked method, the methods invoked by that method, the threads those methods are executing in, and resource usage information for each of those methods. Analysis of collected trace and resource usage information may provide a hierarchical representation, or call tree, of the methods invoked, and the order of their invocation, as well as per-method, per-thread, and overall resource usage for request processing.

As illustrated by arrow 220, HTTP listener 112 may forward the request to an application component 120 for processing. While mainly described herein as forwarding the request, in some embodiments, HTTP listener 112 may invoke a method or instantiate an object of application component 120. In some embodiments, HTTP listener 112 may request that container 200 to instantiate an object or invoke a method of application component 120. In some embodiments, container 200 may represent web container 140 or EJB container 144, described above, or another application component container of application server 100. The resource measurement framework of application server 100 may also include instrumented methods at the boundary between HTTP listener 112 or HTTP server 110 and container 200 or application component 120. For example, application component 120 may include objects derived from classed defined by container 200 and the implementation of those classes in container 200 may include instrumented methods configured to collect and record resource usage data before passing control to the methods and/or objects of application component 120.

As part of processing the request, application component 120 may invoke methods or objects of other services provided by application server 100, such as J2EE connector service 160 or database connectivity service 164. Methods of J2EE connector service 160 and of database connectivity service 164 may be instrumented as part of the resource measurement framework, according to one embodiment. Thus, when application component 120 invoked a method of J2EE connector service 160, illustrated by arrow 230, the instrumented code in J2EE connector service 160 may record and collect additional resource usage data. For example, the resource measurement framework may, via the instrumented code in J2EE connector service 160, record the current time that the method was invoked by application component 120.

Since application component 120 may invoke methods of J2EE connector service in order to access data or systems external to application server 100, such as enterprise information system (EIS) 170, J2EE connect service may also include instrumentation configured to collect and record resource usage regarding the use of EIS 170, represented by arrows 240 and 240. For example, in one embodiment, the resource measurement framework, via instrumented methods of J2EE connector service 160, may record resource usage information both before and after accessing EIS 170. Thus, the resource measurement framework may be configured to measure and record resource usage related to the time spent accessing EIS 170, the amount of memory, disk space, or network bandwidth used, etc. Since, EIS 170 may not be a part of application server 100 and thus may not be instrumented or otherwise configured to record resource usage information, the resource measurement framework, via instrumented methods of J2EE connector service 160, may be configured to record resource usage information both before and after accessing EIS 170. An overall resource usage regarding accessing EIS 170 may then be determined by comparing the resource usage data collected before with resource usage data collected after accessing EIS 170.

Additionally, the resource measurement framework may also record resource usage information when J2EE connector service 160 returns results to application component 120, represented by arrow 235. In one embodiment resource usage data collected when returning results to J2EE connector service may be collected via instrumented code at the exit of the same method in which resource usage information was collected previously when application component 120 invoked J2EE connector service 160. Thus, in some embodiments, individual methods of a service or container of application server 100 may be instrumented in various locations within the method in order collect resource usage information regarding various aspects of the method or of other services or systems accessed by J2EE connector service 160. For instance, application component 120 may invoke method Foo of J2EE connector service 160, represented by arrow 230. Method Foo may then access EIS 170, represented by arrow 240, receive results back from EIS 170, represented by arrow 245 and return results to application component 120, represented by arrow 235. Instrumented portions of method Foo may collect and record resource usage information at both interfaces with application component 120 and at both interfaces with EIS 170. Thus, in one embodiment, a single method may be instrumented in four different areas to collect resource usage information.

As part of processing a request, application component 120 may access or invoke more than one service of application server 100. Thus, as illustrated by arrow 250, application component 120 may invoke a method of database connectivity service 164. For instance, application component 120 may need to access information store in RDBMS 174 and may utilized database connectivity service 164 to do so. The method of database connectivity service 164 invoked by application component 120 may have been instrumented and may be considered part of the resource measurement framework and therefore may be configured to collect and record resource usage data regarding the request processing preformed by application component 120. As described above regarding J2EE connector service 160, the methods of database connectivity service 164 may be instrumented and configured to collect resource usage data related accessing RDBMS 174, represented by arrows 260 and 265 and related to returning results back to application component 120, represented by arrow 255. For example, the resource measurement framework, via instrumented methods of database connectivity service 164, may collect resource usage data such as memory access time, input/output access time, elapsed CPU time, or network bandwidth utilization, total data read or written to RDBMS 174, etc., according to various embodiments. As noted above, the resource measurement framework may collect resource usage data related to both hardware and software resource usage. Thus, the resource usage data collected between the invocation of a method in database connectivity service 164 by application component 120, represented by arrow 250 and the returning of results back to application component 120, represented by arrow 255, may measure and/or characterize the resources used by application component 120 via database connectivity service 164.

Please note that while the discussion above refers to J2EE connector service 160 and database connectivity service 164 returning results to application component 120, in some embodiments, application component 120 may access or invoke methods of services that do not return results. In such embodiments, the methods invoked may still be instrumented and configured to collect resource usage data, as described herein, when exiting and returning control back to application component 120 without returning any results. Additionally, as noted above, the resource measurement framework, via instrumented methods of services such as J2EE connector service 160 or database connectivity service 164, may collect and record resource usage data transparently without application component 120 being aware that any resource usage data is being collected or record and without any instrumentation of application component 120 itself, according to some embodiments.

Figure 3:
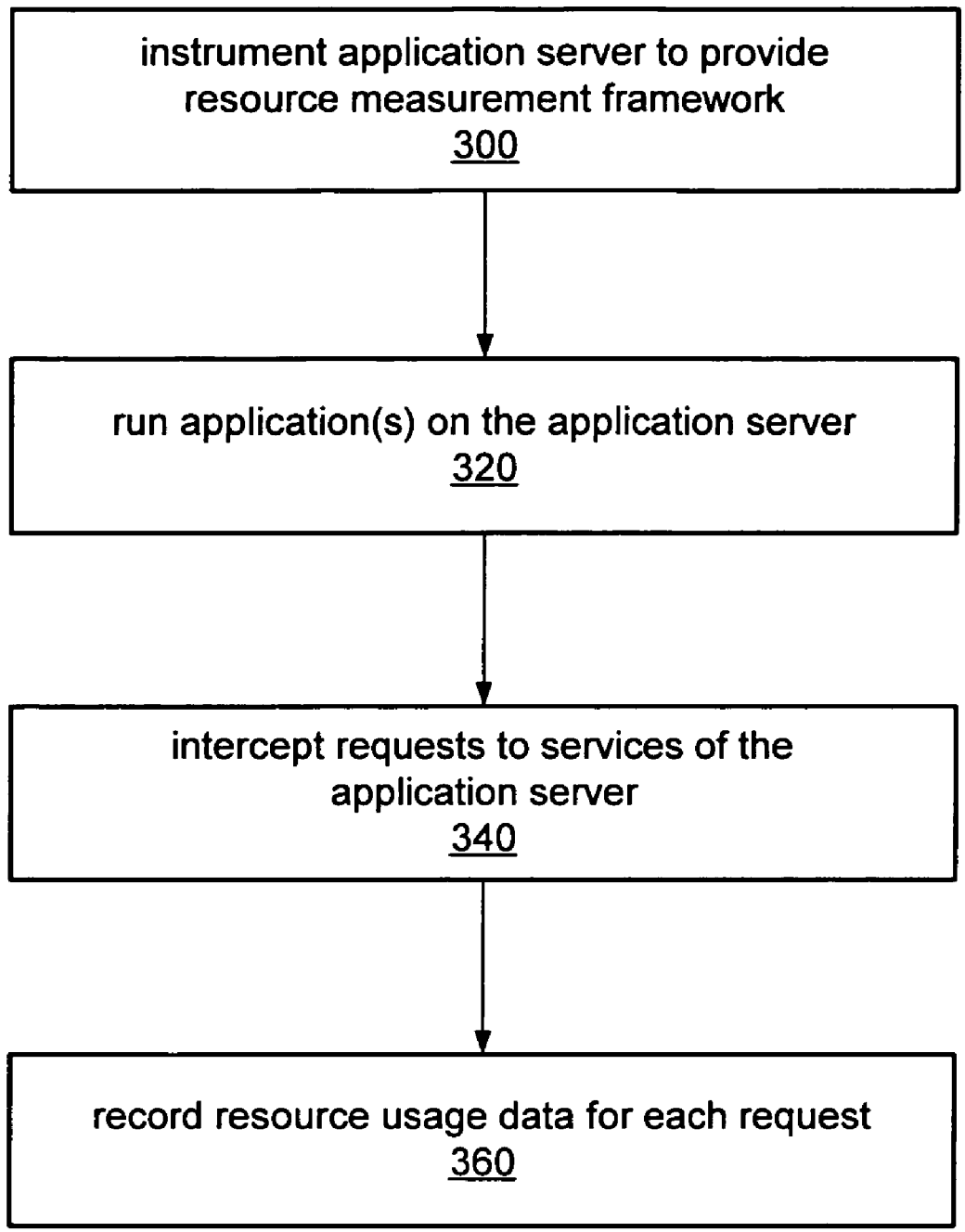
FIG. 3 is a flowchart illustrating one embodiment of a method for implementing automated workload characterization.

FIG. 3 is a flowchart illustrating one embodiment of a method for automatic workload characterization, as described herein. As described above, an application server, such as application server 100, may include multiple services supporting applications running on the application server and the services may include application component containers, such as web container 140 or EJB container 144. In turn the application component container may include application component 120. Application components, such as application components 120 may include the functionality or business logic of an application running on the application server. As indicated by block 300, the application server may be instrumented to provide a resource measurement framework. For example, various components of an application server may be instrumented to include program instructions for collecting and recording resource usage data and/or other execution/performance data regarding the application server when running application components. An application server may not include such instrumentation when initially created or deployed. As part of automated workload characterization, various components, such as the services or containers of the application server may be instrumented to include resource usage collecting instructions. In one embodiment, byte code data including instructions to collect resource usage information may be inserted or added to the byte code for particular application server services or containers. In one embodiment, this instrumentation may be performed on libraries implementing services or containers of the application server. In some embodiments, an application server may be instrumented without having to restart or redeploy the application server. In other embodiments, however, an application server may need to be restarted or redeployed as part of instrumenting the application server.

The portions of application server that are instrumented to include instructions configured to record and collect resource usage information may collectively be referred to as a resource measurement framework. The resource measurement framework may include resource usage collecting instructions at various interception points throughout the application framework. For instance, methods of services provided by the application framework that may be invoked by applications running on the application server, such as a JDBC service providing access to relational databases, may be instrumented to include instructions configured to collect resource usage (or other performance/execution data). Thus, when an application running on the application server invoked one of the instrumented methods of the resource measurement framework, the instrumented method may record resource usage information, such as the total amount of time spent in the invoked method, the total amount of data or memory used, etc. Thus, the application server is instrumented to provide a resource measurement framework including instrumented interception points located at the boundaries or interfaces between application components running on the application server and services or other containers of the application server. As noted above, an application running on an application server may include multiple, individual, application components, each executing within a application component container of the application server, such as web container 140 or EJB container 144.

After an application server is instrumented to provide a resource measurement framework, one or more applications may be executed on the application server, as indicated by block 320. As noted above, an application may include multiple application components each executing within an application component container of the application server. The total, combined, functionality of all the application components may be considered the full functionality of the application. Any of various types of applications, not just benchmark applications, may be run within the application server as part of automated workload characterization. The applications may be configured to response to and process received requests from clients external to the application server. As indicated by block 340, requests to services of the application server may be intercepted. For example, the resource measurement framework may intercept requests or method invocations to the services of the application server.

In some embodiments, these requests may original from clients external to the application server, such as a web client requesting a web page or an IIOP client remotely invoking functionality of the server, such as to access a backend database through the application server. Additionally, the resource measurement framework may also intercept internal requests or method calls to services of the application server. For example, an application component may utilize one of the services of the application server and the resource measurement framework may intercept that request. For specifically, according to some embodiments, such a request may take for form of a method invocation or object instantiation, but in other embodiments, internal messages may be communicated between application components and services of the application component and the resource measurement framework may include instructions located in the request processing portion of a service.

A resource measurement framework may record resource usage data for each intercepted request, as indicated by block 360. As noted above, an application framework may be instrumented to include program instructions configured to capture and record resource usage information. Thus, in one embodiment, a resource measurement framework may intercept a request to a service of the application server, as described above, and may collect and record resource usage information, such as a total amount of time spent in various methods, the total data communicated, the total memory allocated by the service in response to the request, etc. The collected resource information may be stored to a log file or database for later analysis. In some embodiments, collected resource information may initially be stored in memory on the application server and stored or flushed to file at a later time. In one embodiment, all collected resource information may be stored in memory until after the application has completed and then all the collected resource information may be stored to disk, such as in a log file or database.

As noted above, the collected and resource usage data may also include trace data and may record resource usage data by method (or thread). For instance, the collected resource data recorded at a single interception point or instrumented method may include the method invoked and resource usage, such as elapsed clock and CPU time, for the invoked method, according to one embodiment. If an invoked method invokes additional methods in turn, instrumentation in those invoked methods may then collect trace and resource usage data for those methods. In some embodiments, the collected and recorded trace information and resource usage data may be formatted to provide a hierarchical view of the methods invoked (e.g. a call tree) including various resource usage data for each invocation. Table 1 illustrates an example of a set of collected and recorded trace and resource usage data formatted to provided a hierarchical view of the methods invoked. Please note that Table 1 represents one example of recorded resource usage data, according to one embodiment. In other embodiments, different content or formatting may be used when recording trace and/or resource usage data as part of automated workload characterization.

TABLE 1

| Method name | Call-depth | Elapsed clock time (ms) | Elapsed CPU time (ms) |
| --- | --- | --- | --- |
| ScenarioServlet | 0 | 0.0481 | 0.046 |
| HttpServlet.service | 1 | 0.0072 | 0.0065 |
| SerlvetAction.doPortfolio | 2 | 0.0381 | 0.0363 |
| Connection.prepareStatement | 3 | 5.4227 | 1.3356 |
| Container.postFind | 3 | 1.3774 | 0.1206 |
| Utils.serializeObject | 4 | 0.0171 | 0.0164 |
| HttpServlet.service | 3 | 0.1578 | 0.1579 |
| PreparedStatement.executeQuery | 3 | 0.119 | 0.0494 |
| ... | | | |

In some embodiments, a resource measurement framework may record resource usage data related to both software and hardware resource usage. For example, in some embodiments, the resource measurement framework may record hardware resource usage data related to clock data, such as the total amount of time taken in various methods, processor cycle counts, network transmission data, such as the speed, throughput, or total data communicated, and/or mass storage access data, such as the total amount of disk space used, among other things. Additionally, the resource measurement framework may record software resource usage, such as the number of times methods are invoked, information regarding which methods invoke which services or methods, etc.

Additionally, in one embodiment, collected resource information may be communicated to a separate computer or system external to the application server for storage, either as it is collected or at a later time, rather than storing the collected information on the application server itself. For instance, using a separate system to store the collected resource usage information in a file or database may prevent the resource usage related to storing the collected information from affecting the resource usage information collected. In other words, rather than using disk space to store collected resource usage information on the application server when collecting information about the amount of disk space used during execution of the application server, the collected information may be stored on a separate machine and then may not affect the total amount of disk space used on the application server.

In some embodiments, the resource measurement framework may intercept requests and record resource usage transparently to the applications executing on the application server. Thus, in some embodiments, an application running on the application server may not be aware that resource information is being collected and recorded. For example, none of the code for the application itself, or any of its application components, may be instrumented as part of automated workload characterization. Instead, as described above, the services and containers of the application server via which an application component accesses other services, resources or systems, may be instrumented. Thus, in some embodiments, information regarding the execution, performance, and/or resource usage of virtually any application capable of executing on an application server may be characterized as part of automated workload characterization. Additionally, information regarding the execution, performance, and/or resource usage of the application server when executing virtually any application may also be characterized.

Figure 4:
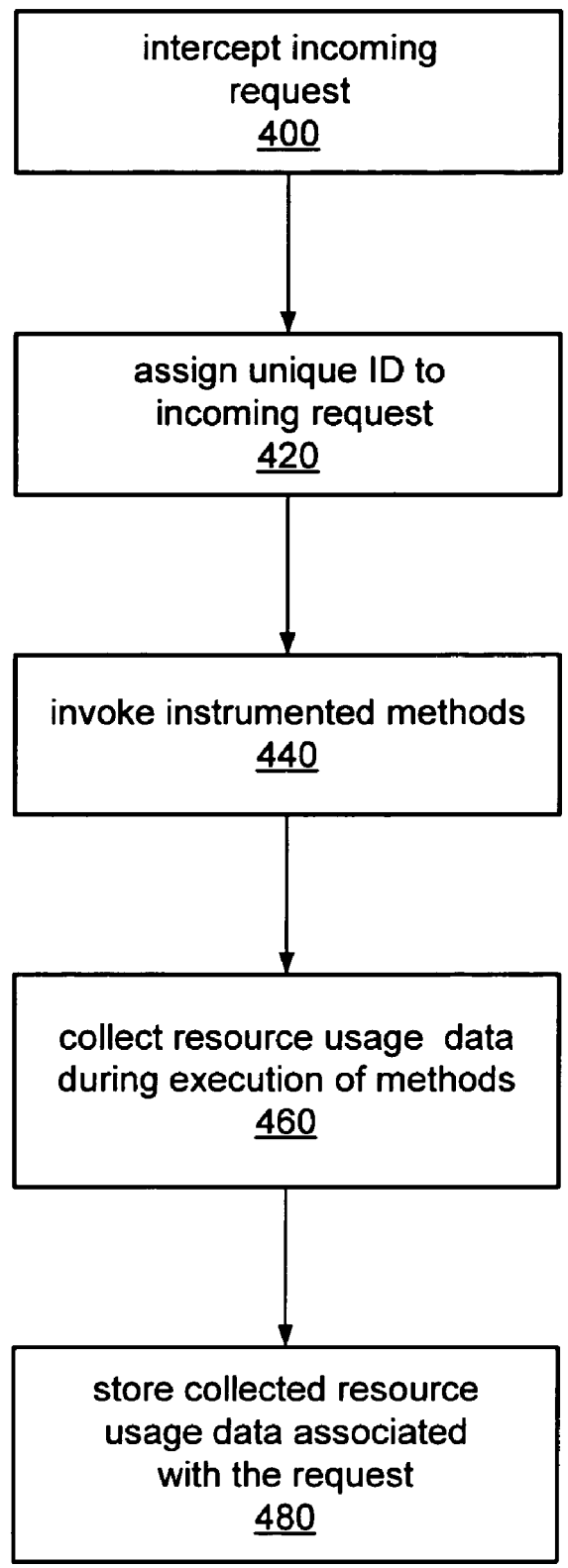
FIG. 4 is a flowchart illustrating one embodiment of a method for collecting resource usage for request processing in an application server.

FIG. 4 illustrates one embodiment of a method for recording resource usage data for an intercepted request, as described herein. As described above, an application server may be instrumented to provide a resource measurement framework configured to records resource usage data regarding the execution of the application server and one or applications running on the application server. The resource measurement framework may intercept a request to a service of the application server, as indicated by block 400. For example, a web client 130 may issue a request to HTTP server 110, which may be intercepted by instrumented code in a HTTP listener 112. The instrumented code that intercepts a request may be considered part of a resource measurement framework, according to some embodiments.

As indicated by block 420, the resource measurement framework may be configured to assign a unique ID to the incoming request. The unique ID may be used through the processing of that request to match up recorded resource usage data with the request. The unique ID may be stored in memory on the application server and the resource measurement framework may be configured to provide a means of associated resource usage data recorded during the processing of the request with the request. For instance, the resource measurement framework may include a ID lookup facility allowing instrumentation code at interception points, such as in a method invoked during the processing of the request, to lookup the unique ID of the request when collecting and recording resource usage during the processing of the request. In one embodiment, the unique ID may be randomly assigned while in other embodiments, the ID may come from the request itself, such as from a network header associated with a request from a web client external to the application server.

As described above, the instrumentation code at that interception point may collect and/or record resource usage information regarding the intercepted request. For instance, the time that the request was received may be recorded. Additionally, information regarding resources, such as the total amount of free or allocated memory of the system, may be recorded for comparison with similar measurements collected at later times during the processing of the request.

As the request is processed by the application server, various methods and/or objects in the application server may be invoked, as indicated by block 440. For example, in response to receiving a request from a client, the application server may invoke method or objects of one or more application components 120. In turn, an application component may invoke instrumented methods of services included in the application server and that are part of the resource measurement framework. For example, a received web request may be passed to an application component that may then invoke methods of a database connectivity service to access data from a database. Alternatively, in other embodiments, portions or components of the application server other than application components 120 may invoke instrumented methods of other portions or components of application server 100. For instance, web container 140 or EJB container 144 may invoke instrumented methods of database connectivity server 164 or message server 162.

The invoked methods may be instrumented as part of the resource measurement framework to collect and record resource usage data regarding the request during execution of the invoked methods, as indicated by block 460. As noted above, an application framework may be instrumented at interfaces or boundaries between application components and other containers and/or services of the application server. Thus, resource usage related to an application component's processing of an request may be recorded at various interception points where that component invokes or calls other services of the application server.

After collecting resource usage related to an intercepted request, such as by instrumentation code at interception points and in methods invoked by application components, the resource measurement framework may store the collected resource usage data associated with the request, such as by using the unique ID assigned to the request, as indicated by block 480. As noted above, collected resource usage data may be stored in a file, such as a log file or database either as the data is collected or at a later time, such as during idle time after the request as been processed. In some embodiments, the collected resource usage data may be stored in memory of the application server until such time that it is stored to disk.

In this example, for each software program to be characterized, automated workload characterization may develop request interceptors 175, as described above. When a client 100 sends a request for processing to an application 140 running within container 132, these interceptors may intercept the incoming request 115, such as a client request, as in block 410.

In some embodiments, a unique request ID may be created for the intercepted request, as illustrated by block 420. In other embodiments, the container or protocol to be characterized may already include a unique request ID that may be suitable for use during automated workload characterization. The unique request ID may be associated with a specific request context or with a particular thread servicing the request and may be used as an index to collected and stored characteristics of the associated request context or thread, in some embodiments.

In this example, when a request that is being processed by application server 120 arrives at an interceptor, such as request interceptor 175 or instrumentation code 135, a new record may be created for the request using a special buffer in the heap. This record may be associated with the unique ID for the request, in some embodiments. At subsequent arrivals and departures from instrumented methods, the instrumented code may collect thread or LWP (light-weight process) level measurements such as the wall-clock time and CPU consumption values.

If, during processing of the request, application 140 invokes one of the instrumented methods of the framework, as illustrated by block 430, instrumentation code 135 may capture information about the invocation in a trace log or file, as in block 440. Instrumentation code 135 may also be configured to record a snapshot of the time the method was invoked, in some embodiments.

In some embodiments, invoking one of the instrumented methods may trigger execution of instrumentation code, such as instrumentation code 135, configured to capture resource usage during execution of the methods. For example, instrumentation code 135 may be configured to monitor and/or log accesses to local or remote memory, input/output devices, the network, or other system resources, as in block 450. Tracing and/or collection of resource usage information may, in some embodiments, be dynamically turned on or off, for example by setting a parameter or otherwise setting or clearing a software "switch" in the instrumentation code at run-time, to enable or disable execution of instrumentation code 135.

When execution of an instrumented method is complete, as illustrated at 460, instrumentation code 135 may also capture its exit in a trace/log file and/or may record the time of exit, according to some embodiments. In some embodiments, instrumentation code 135 may be configured to log resources used during execution of the method, such as the amount of memory written to or accessed, the amount of data transferred to or from an input/output device, or the amount of data transferred across the network.

Collected characteristics of the instrumented methods invoked by the application processing the request may be stored in a buffer or in cache memory, or may be written to a file or database as described above, according to various embodiments, and as shown in block 470. This workload characterization data may be logged in a database, file, or other memory location as execution of the instrumented methods progresses or may be flushed to a database, file, or other location from cache or a buffer upon or after exiting the method, according to different embodiments. In some embodiments, a separate buffer may be used for each servicing thread or request context and a single interceptor may be used to intercept the outgoing response as well as the incoming request. These buffers may be associated with the unique ID assigned to the request. After a successful request/response, the data in the thread's or context's buffer may be flushed or written to a file for analysis, in some embodiments. For example, in one embodiment, trace data may be flushed into one or more transaction trace logs after request processing is complete and these logs may be associated with the unique ID assigned to the request. In some embodiments, workload characterization tool 240 may be used to collate collected characteristics from one or more log files, corresponding to a specific request or thread, and to associate them with the unique ID assigned to the request or thread before storing them.

Figure 5A:
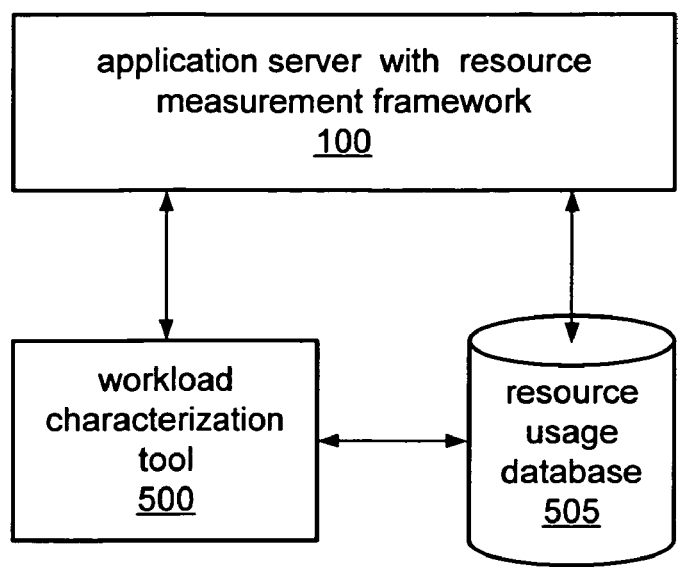
FIG. 5A is a block diagram illustrating a workload characterization tool, in one embodiment.

FIG. 5A is a block diagram illustrating a workload characterization tool capable of automated workload characterization, as described herein. Workload characterization of an application server, such as application server 100 may be automated by use of workload characterization tool, such as workload characterization tool 500. Workload characterization tool 500 may provide a number of different functions or methods for performing automated workload characterization, according to various embodiments. In some embodiments, workload characterization tool 500 may be configured to instrument application server 100 to provide a resource measurement framework, as described above. For instance, in one embodiment, workload characterization tool 500 may be configured to add insert or insert pre-compiled byte-codes to various methods and components of application server 100. As described above, the instrumentation code makes up part of the resource measurement framework on application server 100. As will be discussed below, workload characterization tool 500 may also be configured to perform post execution analysis of collected resource usage data recorded by the resource measurement framework of application server 100.

In some embodiments, workload characterization tool 500 may also be configured to allow the collecting and recording of resource usage data in application server 100 to be dynamically turned on or off. For example, workload characterization tool 500 may be configured to accept user input, such as via a textual or graphical user interface and may also be configured to communicate with the resource measurement framework on application server 100 to turn on or off the collection and recording of resource usage data.

In some embodiments, workload characterization tool 500 may be platform-independent, in that it may be invoked from any computer system (such as a workstation or server supporting Java™ virtual machines) that complies with specified standards. For example, in one embodiment, application server 100 may be executing on a computer server employing SPARC™-based processors provided by Sun Microsystems and a Solaris™ operating system, and workload characterization tool 500 may be executing on a workstation employing Intel processors and a Windows™ operating system. In other embodiments, workload characterization tool 500 and application server 100 may be configured to run within separate processes or virtual machines on the same host computer, or even within the same process on a particular host computer.

As described above, a resource measurement framework in application server 100 may collect and record resource usage data, regarding both hardware and software resource usage, during execution of application server 100. In one embodiment, this collected resource usage data may be written to a database, such as resource usage database 505, and may be indexed in the database according to the ID's associated with requests received from client 130. Workload characterization tool 500 may be configured to access resource usage database 505 in order to process collected resource utilization data, either during or after execution of application server 100, according to various embodiments.

Figure 5B:
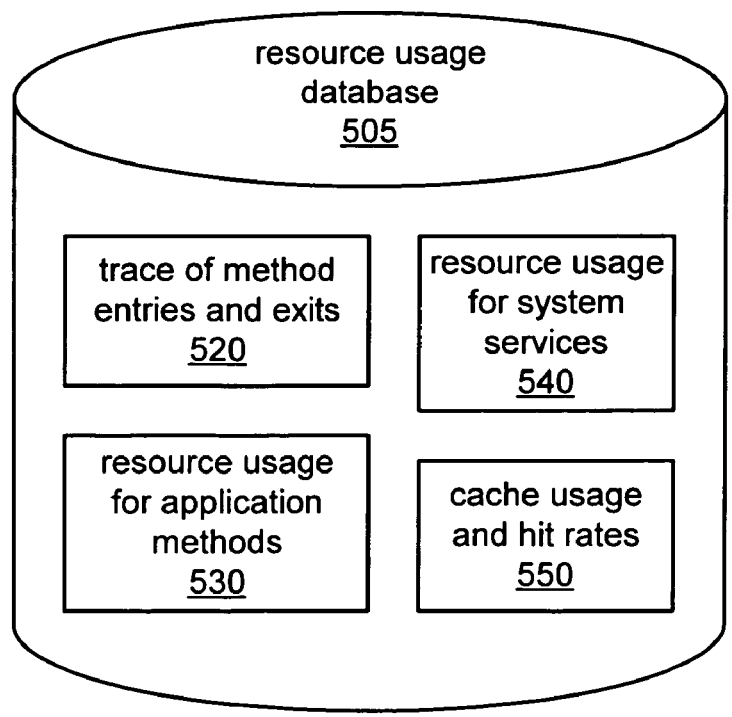
FIG. 5B is a block diagram illustrating various components of a workload characterization database, according to one embodiment.

FIG. 5B is a block diagram illustrating one embodiment of resource usage database 505. In some embodiments, resource usage data collected by a resource measurement framework in application server 100 may be stored in a database, such as resource usage database 505, illustrated in FIG. 5B. Resource usage database 505 may be implemented as a traditional flat file, an object-oriented database, a relational database, or as any other organized collection of data configured to implement a similar function, in various embodiments. Resource usage database 505 may contain, according to different embodiments, various types of data, including collected resource usage data from request processing in application server 100. For example, resource usage database 505 may include one or more transaction logs 510, one or more traces of entry and exit sequences of instrumented methods in application server 100, collected resource usage data for various methods application server 100, and collected resource usage data for various system services in application server 100. Resource usage database 505 may also include collected performance data, such as cache usage and hit rates 550 or other performance data, such as memory access times, I/O access times, network bandwidth measurements, and the like.

In some embodiments, resource usage data including trace data may be collected and stored in resource usage database 505 using a single record for information collected at a single interception point. For example, after intercepting a request from a client 130 and assigning a unique ID for the request, information may be collected at the entry and exit of each instrumented method invoked during request processing. The collected information may represent a hierarchy of method invocations as well as resource usage at each invocation. Thus, a single record of resource usage information collected may include information regarding the method invoked as well as resource information, such as CPU execution time, wall clock time, memory usage, etc.

According to some embodiments, workload characterization tool 500 may be configured to post-process resource usage data collected during execution of a application server 100 and of application component 120 executing with application server 100. The results of this post-processing may also be stored in resource usage database 505, or in another database, file, or other memory location.

In some embodiments, workload characterization tool 500 may be configured to analyze the resource usage data stored in resource usage database 505 and generate hardware and software profiles of the behavior of application server 100. For example, post-run processing may be used to compute where time is spent during transaction processing or to determine the distribution of the services executed on application server 100. This level of detail may permit a variety of investigations into the behavior of application server 100 and its interactions with other components. Automated workload characterization may also facilitate development of system models that may be used to predict the performance of an application server, such as application server 100, executing on application server nodes in a multi-tier system. For example, statistical profiles of each transaction, created automatically by workload characterization tool 500, may be incorporated into a simulation model to simulate behavior of the characterized transactions on simulated systems.

In some embodiments, transaction profiles may be used in combination with a simulation model to study the effect of proposed hardware or software modifications to application server components. For example, one approach to improving replication services may be to use new components, such as new communications hardware, which may result in greater bandwidth or faster execution of the methods employing this hardware. Another approach may be based on changes to the implementation of replication services, both on the replication services nodes and within the application server. In some embodiments, it may be possible to alter parameters representing call counts, service times, and other collected measurements in the profiles generated by automated workload characterization so as to model these kinds of changes and then simulate the results. Thus, the use of a workload characterization tool, coupled with summary programs and parameterized simulation models, may provide a tool for analyzing performance of an application server and for predicting the impact of changes to both the hardware and software components that make up multi-tier systems such as the computer system that includes the application server.

While the above discussion describes a single workload characterization tool as performing both the instrumenting of application server 100 and post-process analysis of collected resource usage data, in some embodiments separate tools may be used for each purpose. Thus, in some embodiments, an instrumentation tool may instrument application server 100 so as to provide a resource measurement framework and a separate analysis tool may analyze the collected resource usage data.

Figure 6:
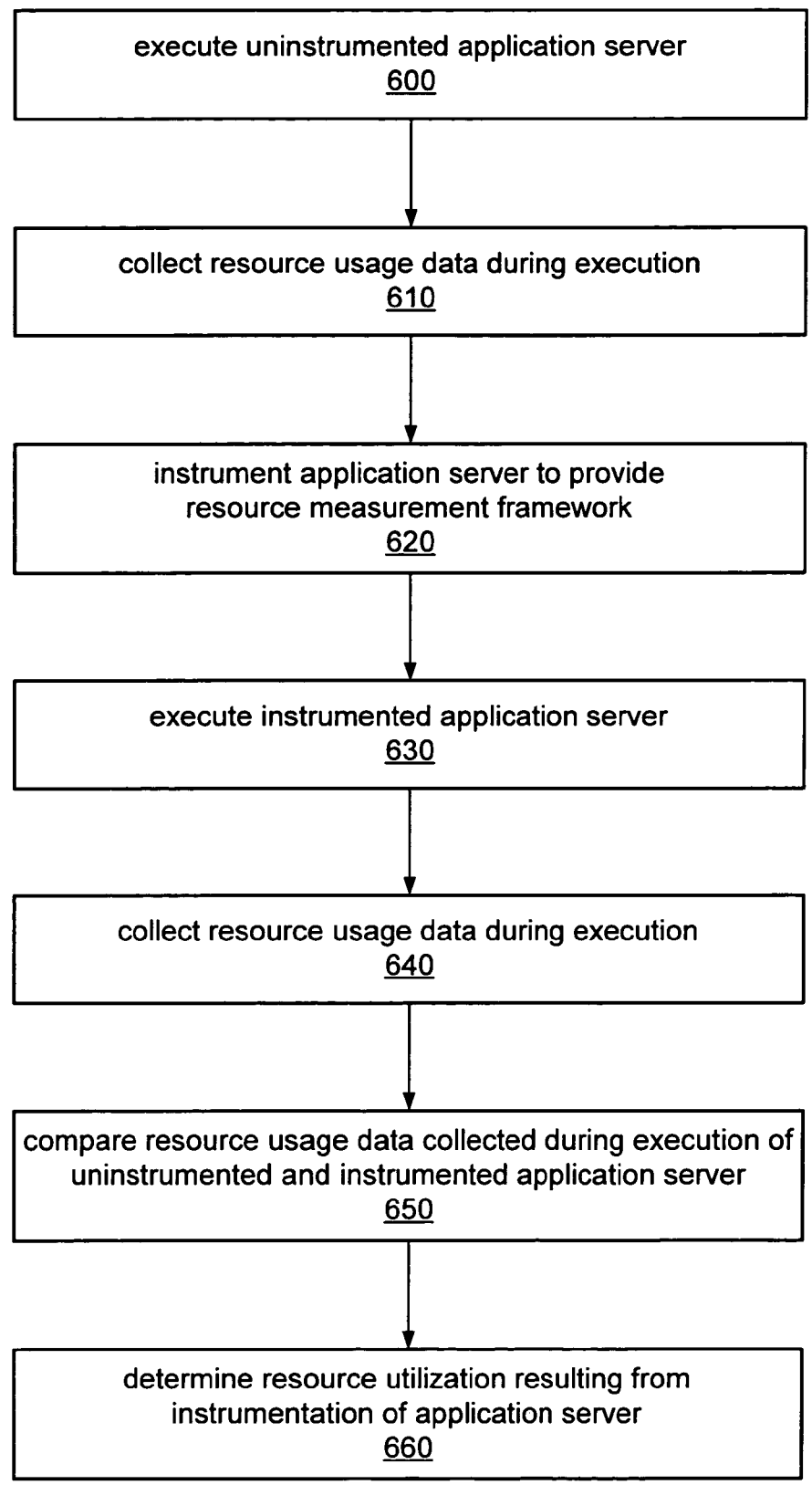
FIG. 6 is a flowchart illustrating a method for determining resource utilization overhead associated with automated workload characterization, according to one embodiment.

In some embodiments, an important part of automated workload characterization may be determining the overhead of the instrumentation used to collect resource usage data during execution of an application server. FIG. 6 is a flowchart illustrating one embodiment of a method for determining the overhead of the instrumentation used for automated workload characterization. Automated workload characterization may utilize the fact that overhead is generally proportional to the number of instrumented methods that are invoked. To get a global perspective on overhead, system measurement tools may be used and the performance of instrumented and uninstrumented runs of an application server, such as application server 100, may be compared, according to some embodiments.

For example, as illustrated by block at 600, an application server, such as application server 100 may be executed before being instrumented as part of automated workload characterization. In one embodiment, the application server may not have any instrumented code at all, while in other embodiments, the application server may include instrumented code that is turned off or otherwise not activated. During the execution of uninstrumented application server 100, resource usage data may be collected and recorded, as indicated by block 610. In some embodiments, the data collected may include the elapsed CPU time and/or wall-clock time during execution of the methods of application server 100. Data collection may be implemented using one or more standard system utilities, such as the UNIX system tools "mpstat" and "iostat", described above, "vmstat", which reports statistics about virtual memory usage, or "netstat", which collects performance statistics for all CPUs in a system.

After executing the uninstrumented application server and collecting resource usage data, the application server may be instrumented to provide a resource measurement framework, as described above and illustrated by block 620. As described above, instrumenting the application server may involve adding program instructions to various components of the application server, such as by inserting pre-compiled byte-codes or using a library of pre-instrumented classes. In some embodiments the application server may need to be restarted after instrumentation, while in other embodiments the application server may be executing throughout the instrumentation process. In some applications, as noted above, the application server may already include instrumented code and instrumenting the application server for determining overhead of the instrumentation may only involve turning on or activating the instrumentated code, such as via workload characterization tool 500, described above.

After being instrumented, the application server may be executed again, as indicated by block 630, and resource usage data may be collected as shown at 640. As described above, the resource measurement framework of instrumented code in application server 100 may collect and record resource usage at various points throughout the execution of application server 100. As also described above, the collected resource usage data may be stored in a log file or database, such as resource usage database 505.

As illustrated by block 650, the resource usage data collected during the instrumented execution of application server 100 may be compared with the resource usage data collected during the uninstrumented execution of application server 100. For example, in some embodiments, workload characterization tool 500 may be configured to compare and analyze the recorded resource usage data from both executions of application server 100. In other embodiments, comparing and analyzing this data may be performed by a separate software modules or program. In yet other embodiments, the comparison may be performed manually. In different embodiments, varying levels and amounts of information may be collected to determine the overhead of automated workload characterization.

Analyzing the data collected during the uninstrumented and instrumented executions of application server 100 may, in some embodiments, involve determining any differences in performance between the instrumented and uninstrumented methods invoked during execution of the application server. For example, workload characterization tool 500 may generate transaction profiles for the instrumented and uninstrumented runs and may generate a report highlighting the differences in the CPU time, wall-clock time, I/O bandwidth, memory utilization, or other attributes of interest between the runs. Thus, as shown at 660, the resource utilization resulting from the instrumentation of application server 100, (e.g. the instrumentation overhead) may be determined, either by workload characterization tool 500, by a separate tool, or manually, according to various embodiments.

Figure 7:
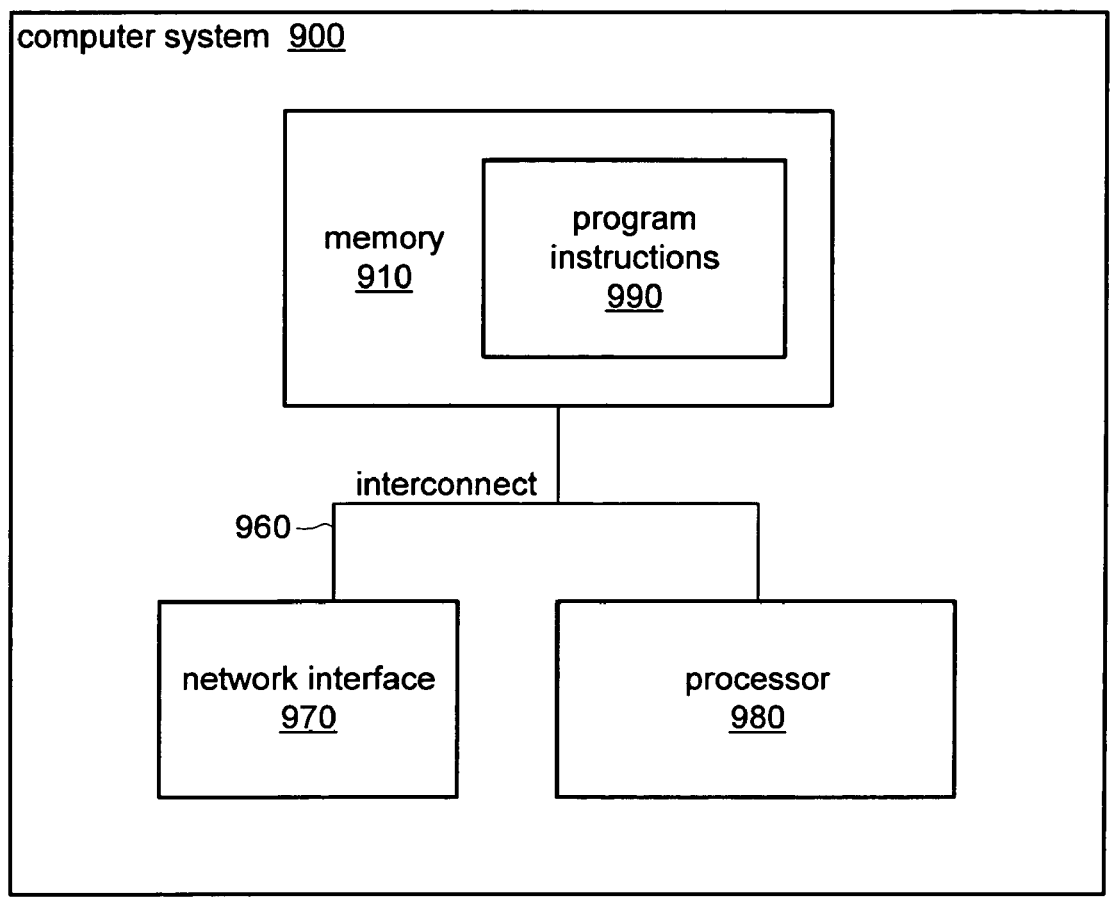
FIG. 7 is a block diagram illustrating one embodiment of a computing system capable of implementing automated workload characterization.

The methods for performing automated workload characterization described herein may be applied to various computing systems on which an application server may execute. For example, FIG. 7 illustrates a computing system capable of implementing automated workload characterization, as described herein according to various embodiments. Computer system 900 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Computer system 900 may include at least one processor 980. In various embodiments, processor 980 may be implemented using any desired architecture or chip set, such as the SPARC™ architecture from Sun Microsystems or the x86-compatible architectures from Intel Corporation, Advanced Micro Devices, etc. Processor 980 may couple across interconnect 960 to memory 910.

Memory 910 is representative of various types of possible memory media, also referred to as "computer accessible media." The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 910 may include program instructions 990 configured to implement automated workload characterization as described herein. In certain embodiments memory 910 may include program instructions configured to implement a workload characterization tool, such as workload characterization tool 500. In such embodiments, workload characterization tool 500 may include program instructions configured to implement automated workload characterization as described herein. Workload characterization tool 500 may be implemented in any of various programming languages or methods. For example, in one embodiment, a workload characterization tool may be Java™ based, while in another embodiment, a workload characterization tool may be written using the C or C++ programming languages. In some embodiments, memory 910 may include program instructions operable to implement an application server 100, or a resource measurement framework, as described herein.

In various embodiments, program instructions for implementing automated workload characterization may be partitioned into multiple software modules, or implemented in combination of hardware and software functions, or may be implemented as a combination of standard system utilities, or of custom software utilities.

In addition to processor 980 and memory 910, computer system 900 may also include one or more network interfaces 970 providing access to a network, such as for interfacing to one or more clients or backend servers, as described herein.

Although various embodiments of automated workload characterization have been described in detail herein as being implemented as one or more computer-implemented (software) methods making up a workload characterization tool, the techniques described may also be implemented using other combinations of hardware and software methods, in other embodiments. The components depicted in FIGS. 1, 2 5A, 5B, and 9, are included for illustrative purposes only as they correspond to exemplary embodiments of automated workload characterization. It should be understood that automated workload characterization, as described herein, may be implemented using fewer, more, or different software and hardware components, organized using fewer, more, or different levels and amounts of hierarchy, in any of various combinations, in other embodiments.

Although the embodiments above have been described in detail, numerous variations and modifications will become apparent once the above disclosure is fully appreciated. For example, while automated workload characterization is described herein mainly in reference to application servers, in some embodiments automated workload characterization may also be used in conjunction with other types of applications, application frameworks, processes and programs executing on any of numerous other types of systems and languages. Similar techniques may also be applied to characterization of other hardware or software components of complex computing systems, in some embodiments. For example, in some embodiments they may be used to characterize a hardware or software protocol implemented in a transaction processing system by instrumenting the protocols (interfaces) between two or more components of the system, collecting trace, performance, and resource utilization data, and performing post-execution analysis of the protocols, as described herein. It is intended that the following claims be interpreted to embrace all such variations and modifications.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A system, comprising:
   one or more processors;
   memory coupled to the one or more processors and comprising program instructions executable by the one or more processors to implement an application server, wherein the application server comprises:
   a plurality of services for supporting one or more applications running on the application server, wherein the plurality of services comprise one or more application component containers for managing the execution of components of the one or more applications running on the application server, and wherein one or more of the components are configured to invoke one or more of the plurality of services;
   a resource measurement framework comprising a plurality of interception points each configured to intercept a request to one of the plurality of services, wherein in response to intercepting a request, the resource measurement framework is configured to record resource usage data for the request;
   wherein the resource measurement framework is configured to record resource usage data for a plurality of requests to the plurality of services for characterizing a workload of the application server while running the one or more applications; and
   wherein the resource measurement framework is configured to record the resource usage data for the plurality of requests in a log, wherein the program instructions are further executable by the one or more processors to implement a workload characterization to parse the log and generate a characterization of the workload for the application server.

2. The system as recited in claim 1, wherein the resource measurement framework comprises program instructions added to program methods of the plurality of services, wherein the program instructions added to program methods of the plurality of services are configured to implement said plurality of interception points to intercept calls to the program methods and record resource usage data for each respective method call.

3. The system as recited in claim 1, wherein the resource measurement framework is configured to intercept requests to the plurality of services and record resource usage data transparently to the one or more applications running on the application server.

4. The system as recited in claim 1, wherein for each request intercepted at one of said plurality of interception points the resource measurement framework is configured to:
   create a unique identifier;
   associate the unique identifier with a thread or context of one of the plurality of services corresponding to the request; and
   associate the resource usage data with the unique identifier.

5. The system as recited in claim 4, wherein for each request intercepted at one of said plurality of interception points the resource measurement framework is configured to:
   intercept a response to the request;
   associate the response with the unique identifier;
   record resource usage data for the response.

6. The system as recited in claim 1, wherein said plurality of services further comprise one or more of a web component container service, an object request broker service, a message service, and a database connectivity service.

7. The system as recited in claim 1, wherein said resource usage data for each request comprises software usage data and hardware usage data.

8. The system as recited in claim 7, wherein said software usage data comprises clock data.

9. The system as recited in claim 7, wherein said hardware usage data comprises one or more of a processor cycle count, network transmission data, and mass storage access data.

10. A method, comprising:
    instrumenting program code for an application server to provide a resource measurement framework for the application server, wherein the application server comprises a plurality of services for supporting one or more applications running on the application server, wherein the plurality of services comprise one or more application component containers for managing the execution of components of the one or more applications running on the application server, wherein one or more of the components are configured to invoke one or more of the plurality of services;

running the one or more applications on the application server;

the resource measurement framework intercepting requests to the plurality of services;

in response to intercepting each request, the resource measurement framework recording resource usage data for the request in a log; and wherein said intercepting and said recording are performed transparently to the one or more applications running on the application server; and performing a workload characterization comprising parsing the log and generating a characterization of the workload for the application server.

11. The method of claim 10, wherein the resource measurement framework comprises program instruction added to program methods of the plurality of services, wherein the program instructions added to the program methods of the plurality of services are configured to implement the plurality of interception points to intercept calls to the program methods and record resource usage data for each respective method call.

12. The method of claim 10, wherein the resource measurement framework is configured to intercept requests to the plurality of services and record resource usage data transparently to the one or more applications running on the application server.

13. The method of claim 10, wherein for each request intercepted at one of the plurality of interception points the resource measurement framework is configured to:

create a unique identifier;

associate a unique identifier with a thread or context of one of the plurality of services corresponding to the request; and associate the resource usage data with the unique identifier.

14. The method of claim 13, where for each request intercepted at one of the plurality of interception points, the resource measurement framework is configured to:

intercept a response to the request;

associate the response with the unique identifier;

record resource usage data for the response.

15. The method of claim 10, wherein the resource usage data for each request comprises software usage data and hardware usage data.

16. The method of claim 15, wherein said hardware usage data comprises one or more of a processor cycle count, network transmission data, and mass storage access data.

17. The method of claim 10, further comprising:

executing the application server prior to said instrumenting; and comparing resource usage data corresponding to said executing with the resource usage data recorded by the resource measurement framework to determine an amount of resource usage related to instrumentation of the application server.

18. A computer accessible storage medium, comprising program instructions, wherein the program instructions are computer executable to implement:

an application server instrumented to provide a resource measurement framework for the application server, wherein the application server comprises a plurality of services for supporting one or more applications running on the application server, wherein the plurality of services comprise one or more application component containers for managing the execution of components of the one or more applications running on the application server, wherein one or more of the components are configured to invoke one or more of the plurality of services;

running the one or more applications on the application server;

the resource measurement framework intercepting requests to the plurality of services;

in response to intercepting each request, the resource measurement framework recording resource usage data for the request in a log; and wherein said intercepting and said recording are performed transparently to the one or more applications running on the application server; and performing a workload characterization comprising parsing the log and generating a characterization of the workload for the application server.

* * * * *

UNITED STATES PATENT AND TRADEMARK OFFICE
CERTIFICATE OF CORRECTION

| | | |
|---|---|---|
| PATENT NO. | : 7,716,335 B2 | Page 1 of 1 |
| APPLICATION NO. | : 11/346900 | |
| DATED | : May 11, 2010 | |
| INVENTOR(S) | : Darpan Dinker et al. | |

It is certified that error appears in the above-identified patent and that said Letters Patent is hereby corrected as shown below:

In column 3, line 13, delete "10," and insert -- IO, --, therefor.

In column 4, line 32, delete "preinvoke, postinvoke" and insert -- preInvoke, postInvoke --, therefor.

In column 4, line 34, delete "preinvoke" and insert -- preInvoke --, therefor.

In column 4, line 34, delete "postinvoke," and insert -- postInvoke, --, therefor.

In column 4, line 37, delete "ejbpassivate," and insert -- ejbPassivate, --, therefor.

In column 23, line 33, delete "instrumentated" and insert -- instrumented --, therefor.

In column 24, line 7, in claim 10, after "log;" delete "and".

In column 28, line 34, in claim 18, after "log;" delete "and".

Signed and Sealed this
Twenty-sixth Day of July, 2011

David J. Kappos
*Director of the United States Patent and Trademark Office*